United States Patent [19]
Cooley et al.

[11] Patent Number: 5,616,902
[45] Date of Patent: Apr. 1, 1997

[54] BILL PAY SYSTEM AND METHOD

[75] Inventors: Robert B. Cooley; Robert L. Burr, both of San Diego, Calif.

[73] Assignee: Lottery Enterprises Inc., San Diego, Calif.

[21] Appl. No.: 304,271

[22] Filed: Sep. 12, 1994

[51] Int. Cl.[6] ............................................. G06K 5/00
[52] U.S. Cl. ............................. 235/380; 235/379; 235/381
[58] Field of Search ................................... 235/380, 472, 235/381, 379

[56] References Cited

U.S. PATENT DOCUMENTS

| | | | |
|---|---|---|---|
| 4,359,631 | 11/1982 | Lockwood et al. | 325/381 |
| 4,731,575 | 3/1988 | Sloan . | |
| 4,859,839 | 8/1989 | Tetelman | 235/383 |
| 4,970,655 | 11/1990 | Winn et al. . | |
| 4,982,071 | 1/1991 | Goto et al. . | |
| 5,183,142 | 2/1993 | Latchinian et al. . | |
| 5,189,291 | 2/1993 | Siemiatkowski | 235/472 |

*Primary Examiner*—Harold Pitts
*Attorney, Agent, or Firm*—Curtis Morris & Safford P.C.; Gregor N. Neff

[57] ABSTRACT

A system of remotely distributed machines is provided for paying bills issued by each of several different remote issuers, such as telephone, electricity, gas, and electric utilities. Each machine preferably has its own computer, a bar-code scanner, and means for accepting payments, preferably in cash. A bill is inserted by the user into the bar-code scanner, which reads the identity of the issuer, the amount owed, and the due date for payment, etc. The user deposits payment into the machine, preferably in cash, and the computer in each machine gives credit for payments made, computes the amount of any late penalties, and computes the balance due. The credits are stored in the machine and the information is conveyed to the proper one of the different issuers. The funds are collected regularly from the machines and credited to the accounts of the different issuers in accordance with the issuer identification data and credits stored in the machine.

14 Claims, 3 Drawing Sheets

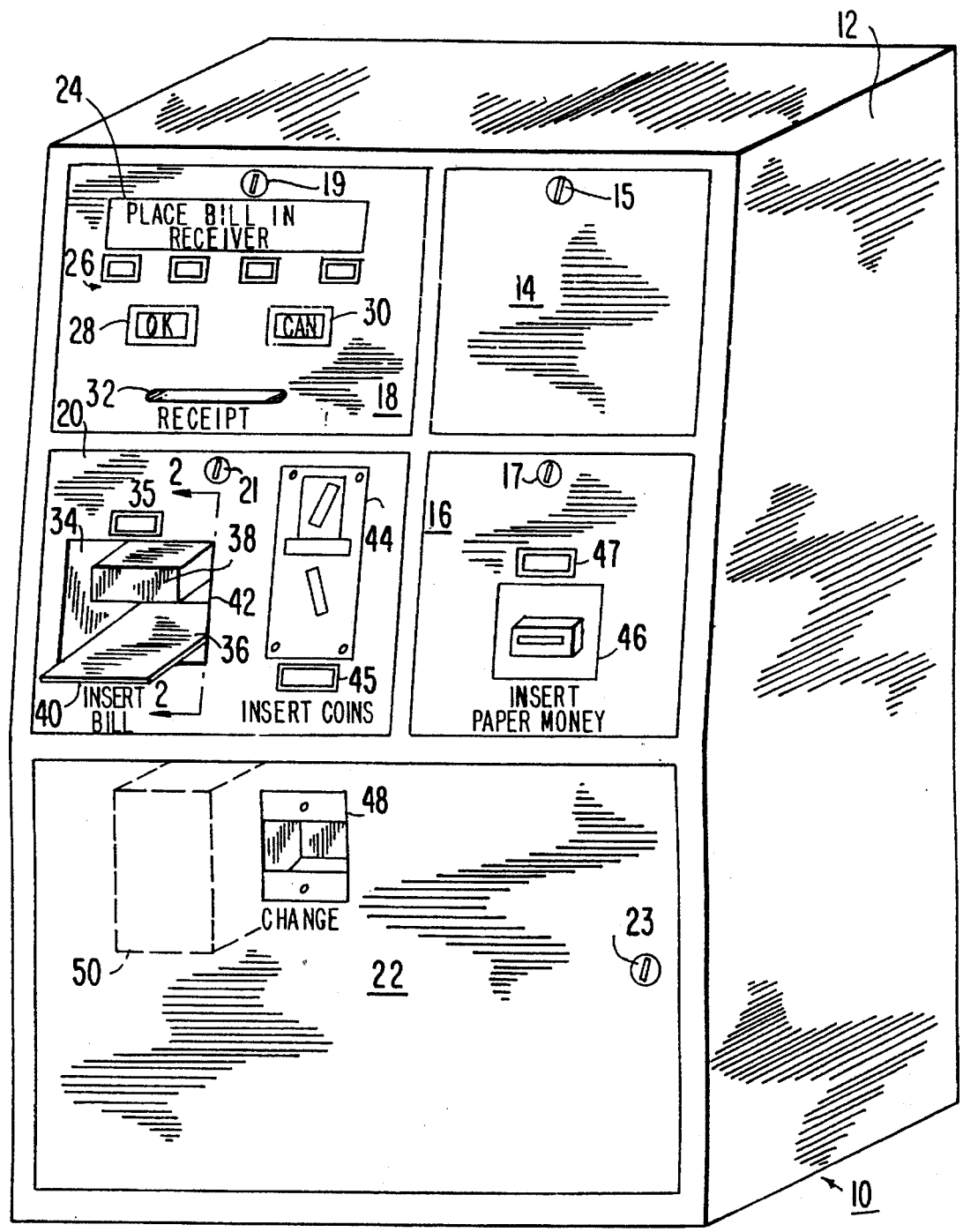
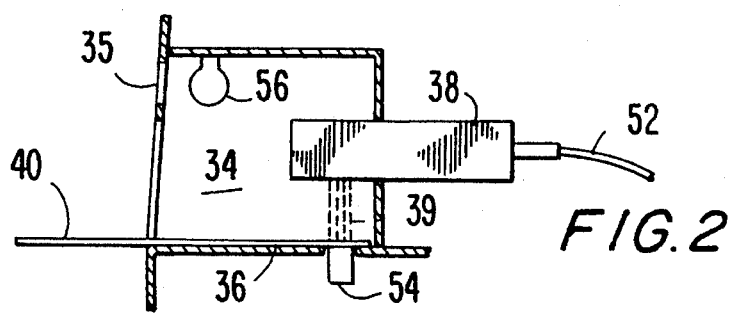
FIG.1
FIG.2

BILL PAY SYSTEM AND METHOD

This invention relates to automated bill payment and accounting, and particularly to such activities at a location remote from the facilities of the issuer of a bill.

In some parts of the world, bills are paid by mailing checks, by credit card payments, electronic fund transfers or similar means.

In other parts of the world, however, such payment means are not normally used. In some countries, payments in cash, either in currency or coins, is the predominant method of payment.

For example, one common method of utilities bill payment is the presentment of a bill by a customer to a clerk or teller at a bank or office of the issuer, together with the cash to pay the bill. The bill contains bar-coded information identifying the customer's account number, and giving data about the amounts owed, the due date, etc. Then, the teller or clerk scans the bar-coded information with a bar-code wand which reads the information into a computer, the computer computes the amount due, and the clerk manually inputs the amount paid. The customer's account is up-dated and the payment is credited to the account of the issuer.

This system has many disadvantages, one being that it is very labor-intensive and costly for the issuers, and the banks and other institutions collecting payments. Another, equally onerous disadvantage is that customers often have to wait in long lines to pay their bills, and can pay them only when tellers or clerks are on duty.

It is an object of the present invention to provide a bill paying system and method which alleviates or eliminates the foregoing disadvantages.

It is a further object of the invention to provide a system and method which is relatively simple, low in cost, secure, widely available at convenient times, and easy to use.

Certain devices have been proposed in the past to facilitate the payment of bills. One such prior art device is shown in U.S. Pat. No. 4,982,071. Such prior devices suffer from a number of disadvantages.

First, data is recorded on magnetic stripes on cards. This is relatively expensive. Unless a very stiff, relatively expensive card material is used to support the magnetic stripe, it can become bent and distorted relatively easily and this can interfere with the recording and/or reading of data to and from the stripe.

Secondly, such prior devices do not lend themselves to widespread distribution because the charge transfer machines are not especially robust and are not adapted for use outside of banks or offices of the issuing company.

Also, such prior devices are not adapted to accept cash, debit cards or other such physical payment means. In fact, if cash is to be paid, it must be paid to an individual clerk or teller. This causes additional labor costs and greatly limits the number of sites suitable for locating one of the bill-paying terminals.

In addition, there is no description of how to use a single machine to accept payments for a substantial number of different issuers and transfer the funds and the payment data from the terminals to the proper recipient.

Additionally, such a system is not well adapted for use in areas which do not have reliable telephone systems.

A further object of the invention is to provide a bill paying system and method in which the foregoing shortcomings are alleviated or eliminated.

In accordance with the present invention, the foregoing objectives are met by the provision of a system and method in which bill-paying machines can be widely dispersed over a given area which the system is designed to serve. Although each machine can serve as a bill-paying machine for only one issuer, it is preferable that a plurality of bill issuers join together in utilizing the dispersed bill-paying machines to pay the bills of any or all of the issuers. This provides the most economical use of the hardware, and minimizes the number of trips to different machines that the consumer otherwise would have to make if the machines were not shared.

Each machine has a bar-code reader which is used to read the bar-code on each of the bills, a monetary acceptance means for accepting payment, preferably in the form of cash, and a computer for computing the payments due, crediting payments to the customer's account, advising as to balances due, and controlling the functions of the machine.

Preferably, each machine is robust, and is lockable to protect the cash and other valuable items which might be stored in the machine.

Preferably, one of the different bill issuers is identified by a part of the bar-code on each bill. This information is used in crediting payments to the right account, and in up-dating payment data.

The problem of inadequate or unavailable telephone line communications is avoided by using a radio-telephone link, or a satellite link to broadcast and transmit information from the remote units to the bill issuers, banks, etc.

Alternatively, a hand-held data reading and storage device can be used manually to read and transfer the data out of the machine whenever an attendant removes money from it. The hand-held device then is transported to a separate location such as a bank or office, together with the cash, so that the data can be transferred to the proper issuer, and credit can be given to the proper issuers for the money collected. The transfer of data and credit can be accomplished by electronic funds and data transfer; by the transportation of data storage records such as discs or tapes, by hand, or by mail; or by modem, cellular telephone, or satellite.

The payment acceptor means can alternatively include or comprise a debit card or credit card acceptor.

If the machine accepts cash, it is preferred that it give change in cash to enable the user to pay the exact amount of his or her bill. Alternatively, the machine can be programmed to accept overpayments as a credit towards the payment of future bills. Preferably, a limit is placed on the amount of change that can be given by the machine to any one customer, so as to avoid misuse of the machine and rapid depletion of the change supply in the machine.

Preferably, a printed receipt is prepared by the machine and issued to the user. The printer also can issue a statement of the account owed, even though the customer does not pay anything on that account.

The foregoing and other objects and advantages of the invention will be apparent from or specified in the following description and drawings.

IN THE DRAWINGS

FIG. 1 is a perspective view of a bill-paying machine constructed in accordance with the present invention;

FIG. 2 is a cross-sectional view of a portion of the bill-paying machine of FIG. 1, taken along lines 2—2;

GENERAL DESCRIPTION

Figure 3:
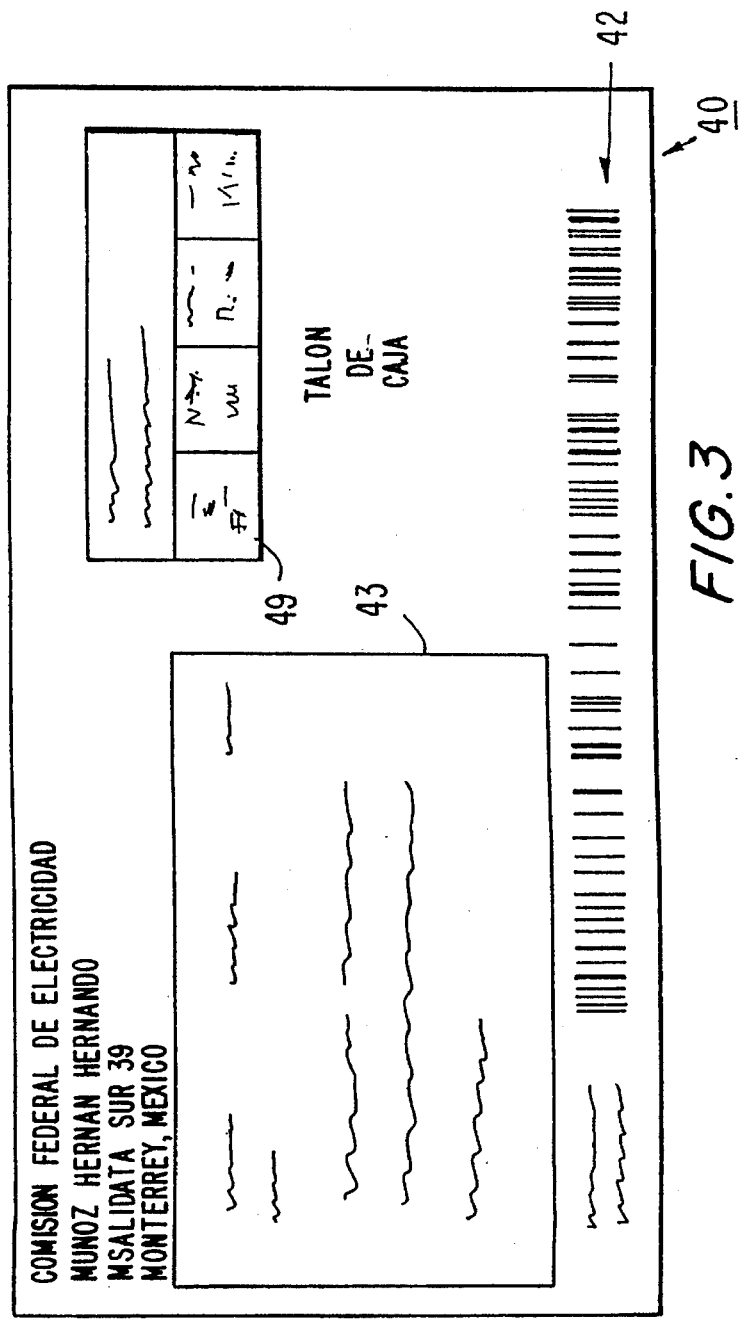
FIG. 3 is a plan view of a typical bill which is to be paid by use of the machine.

FIG. 1 shows a bill-paying machine 10 constructed in accordance with the present invention. The machine 10 includes a secure metal housing 12 with individually lockable hinged access doors 14, 16, 18, 20, and 22. Each of the doors has a threaded key-operated lock 15, 17, 19, 21, and 23, respectively. The locks are of the type which provide the holding strength of a threaded fastener, together with a key-operated lock.

Mounted on the upper left hand panel 18 is a display 24. The display has two lines, forty-characters each, and is of the fluorescent lamp type commonly known as a "FLIP" display. It is used to deliver messages to the user.

A row 26 of programmable keys also is provided.

Two pushbuttons 28 and 30 are provided. The pushbutton 28 is marked "OK" and is provided for signalling that the input or computation is correct, when prompted by the display 24. Pushbutton 30 is to provided for canceling a transaction.

A slot 32 is provided through which a printed receipt is issued. A printer (not shown) located behind the slot issues the receipt or statement upon the completion of a transaction.

Panel 20, in the lower left hand corner of the upper portion of the machine 10 has a recess or cavity 34 (also see FIG. 2).

Figure 4:
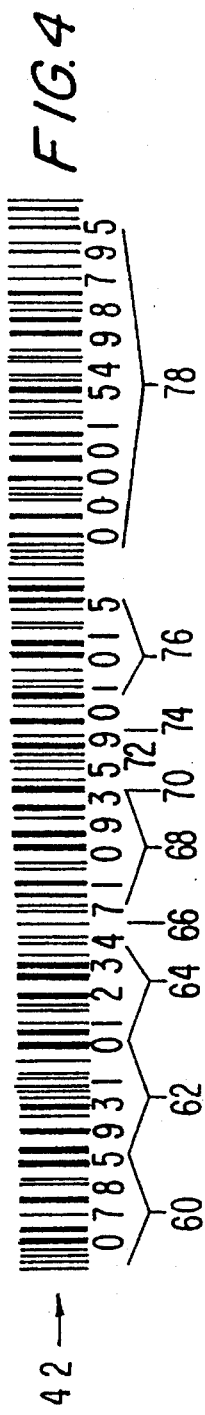
FIG. 4 shows a typical bar-code used on bills to be paid by use of the bill-paying machine of FIG. 1.

The bottom wall 36 of the recess 34 serves as a platform for a bill 40 bearing a bar-code 42 (also see FIGS. 3 and 4). A bar-code scanner 38 is mounted so as to extend into the recess 34 to the extent necessary so that its scanning beam or beams 39 (FIG. 2) scan across the bar-code 42.

As it is shown in FIG. 2, a photoelectric detector 54 of the reflective type detects when a bill 40 is in place and sends a signal to turn on the scanner 38. This prevents the scanner 38 from staying on all the time and unnecessarily using power and/or burning out. The scanner 38 is connected by a cable 52 to the other electronic components of the system.

A lamp 56 is provided within the recess 34, the housing has a transparent window 35 allowing the light from the lamp 56 to be seen by the user. The lamp 56 turns on when the scanner 38 is turned on, thus giving light for the user to see where the bill is located, and indicating positively that the scanner has been turned on.

Also mounted on the panel 20 is a coin acceptor 44, with an indicator light 45 which indicates when there is no more change in the machine to give, and/or other messages.

Mounted on the panel 16 is a paper money acceptor 46 and an indicator lamp 47.

Mounted on the panel 22 is a change receptacle 48 for dispensing change to the user of the machine.

Inside of the housing is a lockable box 50 for collecting coins. The box is easily removable, with a key, to collect the coins from the machine 10.

Similarly, a collector bin (not shown) is provided for the paper money. That bin also is lockable and can be removed to collect the paper money deposited in the machine.

TYPICAL BILL TO BE PAID

FIG. 3 is a top plan view of a typical bill 40 to be paid utilizing the present invention.

The example shown in FIG. 3 is a somewhat schematic electric bill issued by an electric utility company to a hypothetical customer named Munoz in Monterrey, Mex. Various printed information appears in the fields 43 and 49, and the bar-code 42 is printed along the lower longitudinal edge of the bill.

Such a bill is issued by each of several different utilities in some countries, such as Mexico. The bar-code is located in the same location for each of the bills, but contains different information, depending upon the utility involved, and other variables.

FIG. 4 is an enlarged and more detailed drawing of a typical bar-code as used on such a utility bill as that shown in FIG. 3.

Now referring to FIG. 4, the first field 60 consists of digits 1–4, which identify the issuer of the bill, such as a particular electric company, water company, etc. Of course, it should be understood that the company indicated could be any governmental agency, or a retail establishment, where the retail establishment uses the bill-paying machine system for payment by its customers, or any other issuer of bills.

A second field, including digits 5–8, contains the year and the month the contract for supply of electricity was signed.

Field 64, including digits 9–12, is the number of the contract with the customer.

Field 66, consists of a single digit, number 13, which is a checksum.

Field 68, digits 14–17, identify the month and the year of billing.

Field 70, consisting of a single digit 18, indicates the type of user; e.g., residential, industrial, federal, state or city government, rural, water pumping, etc. This information can be used to establish the appropriate charge rate.

Field 72, consisting of a single digit 19, is another checksum.

Field 74, consisting of a single digit 20, is a digit separating the preceding fields from the subsequent fields.

Field 76 consisting of four digits, 21–25, is the month and the day when the bill becomes overdue.

Field 78, consisting of eleven digits, gives the amount to be paid.

BILL-PAY SYSTEM

Figure 5:
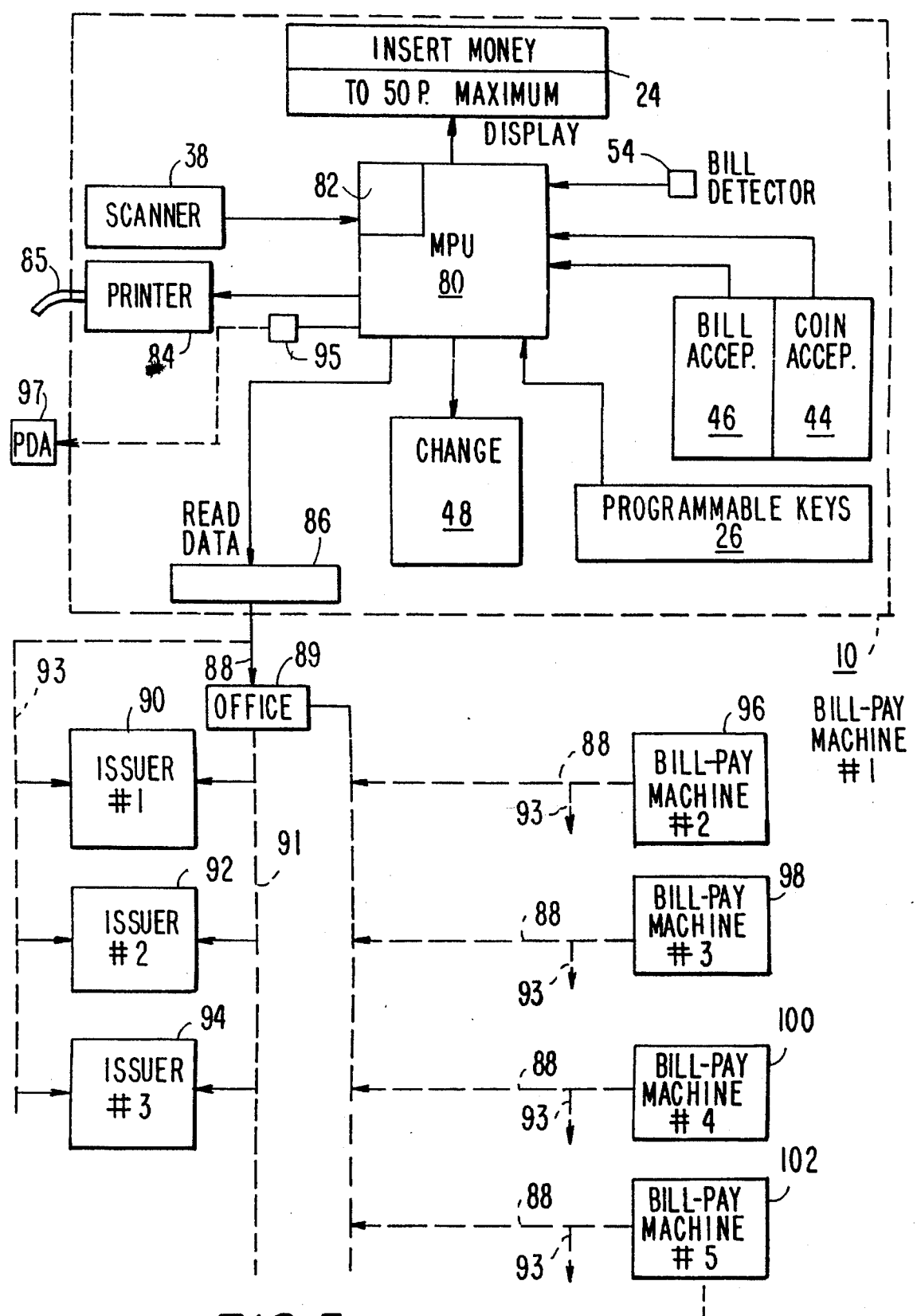
FIG. 5 is a schematic block diagram of the bill-paying system of the present invention.

FIG. 5 is a schematic block diagram of the bill paying system. The system includes a plurality of bill-pay machines 10, 96, 98, 100 and 102. The electrical components of the machine 10 is shown in detail. Each of the other bill-paying machines 96, 98, 100 and 102 is the same as the machine 10, and therefore is shown only as a block.

Multiple computers or other data receiving and storage devices 90, 92 and 94, which are located at the remote offices of issuers of the bills, are shown connected to receive data from one or more of the bill-paying machines through a data reading device 86, a line or other data transmission link 88, through a bank or office 89, and a line or other transmission link 91.

Additional data links 93 for communicating data directly to the bill issuing offices from the bill-paying machines also are shown.

The dashed lines at the bottoms of blocks numbers 94 and 102 indicate that additional issuers and bill-paying machines can be added to the system, as desired. Normally, the number of bill-paying machines will be larger than the five shown in FIG. 5.

Each bill-paying machine 10 includes a microprocessor 80 with a stored program 82. Connected to the microprocessor are the display 24; the scanner 38; the bill detector 54; the bill acceptor 46; the coin acceptor 44; the programmable keys 26, the change making device 48; a printer 84 for printing and issuing the receipt to the customer; and the data reading device 86, which either can be a dial-up modem, or one of several other devices to be described below.

SCANNER

Preferably, the scanner 38 used in the bill-paying machine is of the fixed-mount variety. The preferred scanner is a laser scanner, such as the Model LPN9626RR1S032 sold by Opticon Laser.

Alternatively, a CCD scanner can be used. Both scanners are capable of scanning the stationary bar-code 42 on the bill 40, without the motion of any physical parts.

The laser scanner is preferred because it is believed to be the most accurate, even though it is somewhat more expensive that the CCD scanner.

An alternative scanner which can be used under certain circumstances is a bar-code scanning wand which must be moved relative to the bar-code to scan it. If a stationary wand is used, the bill would be inserted into the machine and moved lengthwise of the bar-code past the wand. Alternatively, the wand could be moved mechanically across the bar-code on a stationary bill.

MICROPROCESSOR

The microprocessor 80 can be any one of a number of commercially available integrated circuit microprocessors, such as the Motorola HC11. Preferably, it has battery-backed random access memory ("RAM") and read-only memory ("ROM").

FUNDS AND DATA TRANSFER

The cash which is collected in the locked boxes is removed from the bill-paying machine periodically by authorized representatives. The funds are carried to the office 89 (FIG. 5) or other safe collection point, where the funds are credited to the accounts of the respective issuers. The data regarding the funds in the individual accounts of the bill payers are then transmitted to the issuers, either directly from the bill-paying machines through links 93, or through links 88 and the office 89. It should be understood that the dashed lines 88 and 93 indicating the paths of transfer of data can indicate data transmission over telephone lines or dedicated lines, but preferably indicate transmission by cellular telephone, or through satellite data transmission channels.

If cellular or satellite data links are used, then the unit 86 in each bill-paying machine includes appropriate transmitters, and each issuer location would have corresponding receiving and transmission equipment.

If cellular telephones are used to transfer the data, preferably, the data is transferred at night when usage rates are low. Preferably, the frequencies between voice frequencies are used for data transmission.

If desired, wireless remote transmission and monitoring of the bill-paying machines can be accomplished by use of a wireless service such as that made available by RAM Mobile Data Company of Woodbridge, N.J.

Alternatively, a hand-held data recording and reproducing device can be used to gather the data from each machine by the representative who collects cash from the machine, and the data recorder can be carried to the office 89 to be stored and transmitted to the issuers, while the cash is credited to the accounts of the appropriate issuers, in accordance with the payment data.

Examples of hand-held data terminals which can be used for this purpose include the so-called "PDA" machine 97; the "Newton" laptop computer sold by Apple Computer, etc. Such machines can be simply plugged into a connector 95 for a serial port on the microprocessor 80 to read the data out, and the data can be read out of the portable device at the office 89 in a similar fashion.

Each such portable device preferably has a display, a key pad or pen type data entry means, a non-volatile memory of relatively large capacity, and a serial port or infra-red or r-f link data transfer means.

This method of data gathering is advantageous in that, since the cash should be removed by and authorized representative from the bill-pay machines frequently, the incremental time required for that person to read out the data could be relatively small. Also, only one hand-held portable data terminal is needed for each representative each, as compared to one read-out and communications device per machine if the data is transmitted electronically.

Data can be transferred to and from the portable device 97 by infra-red or r-f data link, instead of by use of the serial port, if desired.

Alternatively, data can be stored in non-volatile memory chips mounted on easily-removable circuit cards, such as "PCMCIA" cards used in laptop computers for such a purpose. The card simply can be removed by the representative when he or she removes funds from the machines. The representative then replaces each data-containing card with an empty card. The data-containing card then is carried to the office 89 where its data is read out and transmitted as described above.

Alternatively, a portable hand-held computer adapted to use PCMCIA cards is used to gather data from the bill-pay machines. The card containing data is removed from the bill-pay machine, plugged into the hand-held computer to empty its data into the hand-held device, and then replaced in the bill-pay machine.

This combination has the advantage, over the use of replaceable cards, in that far fewer cards are needed, and a possibly cumbersome load of cards need not be carried to and from the office 89 by the service representative.

OPERATION

Each bill-paying machine is programmed to operate as follows. The specific programming steps used to achieve these results are not described in detail herein because they are well within the skill of the art to perform.

1. When the machine is in stand-by, waiting for a customer, it displays a message on the display 24, such as "PLACE BILL IN RECEIVER", in the language appropriate to the location of the machine. Preferably, in the stand-by mode, the scanner 38 is turned off.

2. The user inserts the bill into the recess 34 and places it on the support platform 36 with the bar-code 42 along the rear edge.

3. The detector 54 detects the presence of a bill and sends a signal which turns on the scanner 38. The scanner 38 scans and reads the bar-code data.

4. Stored in the computer 80 is a set of instructions instructing it to detect whether the payment date has passed. If so, it computes and applies a late penalty, in accordance with stored instructions.

In some cases, where the payment is very late, the utility will have been disconnected; that is, the telephone, water, gas, etc. will have been turned off, and a fee for reconnection must be added to the bill. Reconnection fees are computed or retrieved from memory and added to one bill. Next, the total amount due, including any late penalties and reconnection fees, is displayed.

5. If the user is not then prepared to pay the bill, he can simply press one of the pre-programmed buttons 26 to print out a statement which is printed by the printer in the machine (not shown), dispensed through the slot 32 and cut off. The printer preferably is a simple dot-matrix printer with a conventional paper cut-off mechanism.

6. The computer next causes an appropriate message to be displayed on the display 24, such as "DEPOSIT MONEY", or the equivalent. The user then inserts paper money into the bill acceptor 46 and/or coins into the coin acceptor 44. As each bill or coin is deposited and accepted, a corresponding credit is developed and the accumulated credit total is displayed on the display 24.

When the total credits equal or exceed the amount due, the display 24 indicates that the bill has been paid.

7. If the amount deposited exceeds the amount due by no more than a pre-determined amount, and if the machine has sufficient funds to issue change, change will be dispensed into the change receptacle 48.

8. Alternatively, if the user wishes to apply the excess payment as a credit against future bills, he operates one of the programmable keys 26 to indicate this fact, and the machine indicates this credit balance, stores it, and prints this information out on a receipt issued by the printer through the slot 32.

9. If the machine is out of change; that is, if it does not have enough change to pay out the maximum amount of change for any given transaction, this fact will be indicated by the lamp 45 which may display a message such as "EXACT CHANGE ONLY".

10. If the money deposited by the user does not equal or exceed the amount of the bill due, the user can cancel the transaction by pressing the cancel button 30 and receive a full refund.

11. In an alternative arrangement, the machine will not accept a bill or coin which drives the total paid over the amount due by more than the change limit.

12. The "OK" button 28 is pressed pursuant to prompts displayed on the display 24 at various points during each transaction to indicate the user's acceptance of the operations indicated.

As it can be seen from the foregoing, the invention admirably meets the objectives set forth above.

Each of the bill-pay machines 10 is a physically secure unit which can accept cash or another payment means to pay bills due to the various issuers who use the machines. The machines can be located in bank lobbies, in offices of the issuers, and in diverse other locations, such as grocery stores, travel offices, bus, air line and train terminals, and other locations, such as convenience stores and the like where personnel are at hand to keep an eye on the machines.

Also, with remote surveillance by video cameras, the machines can be located at sites which are unguarded by people who are physically present.

The user need not use electronic fund transfer to transfer funds, and need not pay cash to a teller or clerk. This greatly speeds the payment of the bills and reduces labor costs.

Bar-codes can be printed on ordinary paper, so that the bills need not be printed on heavy, expensive card stock. The printing of the coded information on the bills is relatively inexpensive, and the bar-code readers used also can be relatively inexpensive.

Each of a plurality of bill issuers is identified simply and easily by storing its identification as part of the bar-code. This information is used, conveniently, to deposit the funds collected from the machine to the accounts of the proper issuers, and to transmit the account information to those issuers so that the next bill they issue to the customer will take account of the payments made at the machines.

Change is given for cash transactions, and yet the maximum amount of change given is limited so as to minimize misuse of the bill-paying machines simply to give change and to preserve the change supply in the machine.

Data transfer is accomplished, in certain forms of the invention, without the need for reliable telephone lines. Thus, the unit 86 in FIG. 5 can be either a modem for transmission over telephone lines, or a wireless transmitter, or a hand-held data terminal or other hand method of data transfer can be used.

The above description of the invention is intended to be illustrative and not limiting. Various changes or modifications in the embodiments described may occur to those skilled in the art. These can be made without departing from the spirit or scope of the invention.

We claim:

1. A bill paying machine for the payment of bills bearing bar-coded information regarding the bill owed and the person or entity owing it, said machine comprising, in combination, a support structure, a bar-code scanner secured to said structure, a payment accepting device secured to said structure for accepting payment against amounts due on said bill, and a computer for applying payments against said amounts due and computing the payment status of said bill.

2. A machine as in claim 1 in which said scanner is selected from the group consisting of a laser bar-code scanner, a CCD bar-code scanner, and a bar-code scanning wand.

3. A machine as in claim 1 including a display device for displaying information to a user of said machine, said computer being adapted to control said display device to display information regarding said bill.

4. A machine as in claim 1 including means for storing information regarding the payments made by users of said machine, and the accounts of said users, for delivery to the issuer of said bill.

5. A machine as in claim 4, in which said issuer is one of a plurality of different bill issuers, each identified by a different code, and including a communications device for communicating said information to the one of said issuers corresponding to said code.

6. A machine as in claim 4 including means for transmitting said information to said issuer of said bill, said means being selected from the group consisting of an on-line modem, a dial-up modem; a radio-telephone; a satellite link; and a portable data storage device.

7. A machine as in claim 1 in which said payment accepting device comprising a device for accepting cash and holding said cash securely until gathered.

8. A machine as in claim 7 including a device for giving cash change for overpayments of amounts due.

9. A machine as in claim 8 including means for limiting the amount of change given to a maximum value, and for refusing cash payments whose total would exceed the amount due by more than said maximum value.

10. A machine as in claim 9 including a coin acceptor and a coin dispenser for giving change.

11. A machine as in claim 1 including a printer device for printing and issuing to the user a statement regarding the payment status of said bill, and a receipt for any payment made.

12. A machine as in claim 1 including a bill support surface for supporting a bill adjacent said scanner with the bar-code on said bill in a position to be scanned by said scanner, said bar-code scanner being capable of scanning the bar-code on said bill while it is stationary on said bill support surface.

13. A machine as in claim 1 in which said computer is adapted to determine from information signals received from said scanner whether said user is late in paying said bill, the amount of time by which said user is late, and any penalty due for lateness, and inform the user of said penalty.

14. A machine as in claim 1 in which said payment acceptance device is a debit or credit card payment acceptor.

* * * * *